K. TANAKA.
PROCESS OF DEGUMMING SILK, SILK WASTE, AND THE LIKE.
APPLICATION FILED DEC. 8, 1916.
1,268,513.
Patented June 4, 1918.
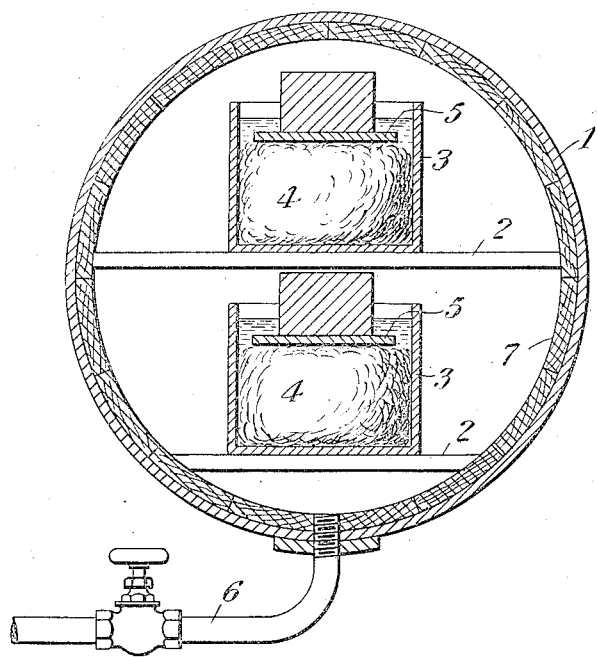
Inventor
Kichizo Tanaka
By his Attorney
Wm Wallace White

UNITED STATES PATENT OFFICE.

KICHIZO TANAKA, OF NAKASHIMA GUN, AICHI KEN, JAPAN.

PROCESS OF DEGUMMING SILK, SILK WASTE, AND THE LIKE.

1,268,513.      Specification of Letters Patent.      Patented June 4, 1918.

Application filed December 8, 1916. Serial No. 135,874.

*To all whom it may concern:*

Be it known that I, KICHIZO TANAKA, subject of Japan, residing at No. 794, Ichinomiya, Ichinomiya Machi, Nakashima Gun, Aichi Ken, Japan, have invented new and useful Improvements in Processes of Degumming Silk, Silk Waste, and the like, of which the following is a specification.

This invention relates to a method to degum material for spun silk which consists in putting silk waste in a small metal vessel together with degumming fluid, preventing the silk waste from appearing above the fluid by means of a floating cover or the like, and in steaming the same under pressure in the vessel without stirring it. The object of this invention is, by causing hydrolysis on the surface of silk fibers by means of a high heat, to obtain fibers rich in luster and resiliency without injuring them; to minimize the loss of substance caused by degumming treatment, and to economize the time required for the treatment.

The drawing annexed is a vertical section of the apparatus adapted for carrying out my invention.

According to methods hitherto used to degum silk waste for the purpose of manufacturing spun silk, silk waste is boiled for from 1½ to 2 hours by passing steam into the tub. This boiling is sometimes repeated two or more times. Then the silk waste is steeped in water and allowed to remain in it, in summer, for about five days, and in winter, for about fourteen days, changing the water from time to time, after which the real process of degumming commences. The silk waste is now placed in a trough and boiled either in a degumming solution or in water, thus perfectly or partially degumming the silk waste. But silk waste having passed through the process of boiling, drying, etc., the sericin, fibroin, etc., forming the surface thereof is turned into a hard, horny substance, and consequently a complicated preliminary treatment becomes necessary, as degumming solution does not easily act upon the fibers on account of the horny coating. Moreover, the putrefying action which takes place during the process and the irregular action of the degumming solution on the silk waste, acting over too much here and there, cause a great loss of substance. Further, in the process proper of degumming, the silk waste is treated in a large vessel, and consequently, unless continuously stirred, it will not be uniformly degummed. Now, not only does this stirring action cause the fibers to entangle, but greatly injures them, corroding their surface and giving them irregular, uneven outline. Thus the silk waste loses much of its luster and resiliency, and becomes unpleasant to touch. And even then the silk waste is very often not uniformly degummed.

Now, I have found that when silk fibers are subjected to a high heat under pressure, hydrolysis is caused on their surfaces and that they are then readily acted upon by a degumming solution. I have availed myself of this fact in my invention and have succeeded to perfectly degum silk waste without injuring their surfaces in the least and without going through the complicated process. The following is an example of carrying out my invention.

Provide a suitable chamber (1) which is made of iron, brick or the like, lined with wooden planks (7) or other material, and which can be tightly closed, with two or three layers of lattice work shelves (2). On these shelves are arranged a number of small metal boxes (3) opening at the top, in which are placed silk waste immersed in a degumming fluid which is a mixed solution of soap and carbonate of soda. In each vessel the silk waste is kept down by a floating lid which prevents its appearing above the fluid. The chamber is then closed and steam is passed into it through a steam pipe (6) for from 1 to 1½ hours, maintaining a pressure of 15 to 20 pounds. Then the vessels (3) are taken out and their contents washed first with tepid water and then with cold water, and then dried.

My invention differs from the known methods in the following points:—

1. The hard, horny coating of silk fibers, formed of coagulation of sericin and fibroin, is caused to hydrolyze by subjecting the fibers to a high heat under pressure, and then the degumming solution acts upon the silk waste readily and degums it in a very short time.

2. The fibers degummed according to my invention show very smooth surface, without any irregularities such as knots, corrosions and the like. This can be easily seen by examining the fibers under a microscope. They are also rich in luster and resiliency.

3. In apparatus commonly used, silk waste is put in a large vessel, and it is necessary to constantly stir the same; but according to my invention there is no such necessity, and thus labor is greatly economized.

4. According to my invention, the distribution of heat and the contact of the silk waste with the degumming fluid is more uniform, and it is far easier to regulate the stages of degumming than in the case of apparatus hitherto commonly used; thus products of the same quality can be obtained every time, as there is least danger of over boiling, imperfect degumming, etc.

5. In apparatus hitherto commonly used, as the preliminary process, the dry material is steeped in water from 5 to 10 days in order to cause putrefaction and fermentation. According to my invention such preliminary treatment is totally dispensed with, thus greatly shortening the period required for degumming silk waste. Moreover, according to my invention, the rate of production is very high, as there is no loss of substance by the action of putrefaction.

Having thus described my invention, what I claim and desire to secure by Letters Patent is:—

1. A process of degumming silk which consists in treating the silk with a degumming fluid and with steam under pressure.

2. A process of degumming silk which consists in immersing the silk in a degumming fluid, and then subjecting the fluid to steam under a pressure of fifteen to twenty pounds.

3. A process of degumming silk which consists in immersing the silk in a degumming fluid, and then heating the fluid by means of steam under steam pressure.

4. A process of degumming silk which consists in treating the silk with a mixed solution of soap and sodium bicarbonate, and heating the solution by means of steam under steam pressure.

5. A process of degumming silk which consists in immersing the silk in a degumming fluid, and then applying steam, of not less than ten pounds pressure, to the fluid.

In testimony whereof I have signed my name to this specification in the presence of two subscribing witnesses.

KICHIZO TANAKA.

Witnesses:
YOSHIKA IKEDA,
H. F. HAWLEY.